(12) United States Patent
Kuo

(10) Patent No.: US 8,336,451 B2
(45) Date of Patent: Dec. 25, 2012

(54) GRILL

(75) Inventor: Hwaihsiang Kuo, Tainan County (TW)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 700 days.

(21) Appl. No.: 12/550,511

(22) Filed: Aug. 31, 2009

(65) Prior Publication Data

US 2010/0050883 A1    Mar. 4, 2010

(30) Foreign Application Priority Data

Aug. 29, 2008  (CN) .................. 2008 2 0145421 U

(51) Int. Cl.
*A47J 37/06* (2006.01)
*A47J 37/08* (2006.01)
(52) U.S. Cl. .......................... 99/376; 99/379
(58) Field of Classification Search .............. 99/372, 99/374, 376–379, 349, 350, 351, 357
See application file for complete search history.

(56) References Cited

U.S. PATENT DOCUMENTS

| 2,241,740 A | * | 5/1941 | Schmid | 99/376 |
| 4,364,308 A | * | 12/1982 | John et al. | 99/351 |
| 6,439,108 B1 | * | 8/2002 | Wu | 99/349 |

* cited by examiner

*Primary Examiner* — Kien Nguyen
(74) *Attorney, Agent, or Firm* — Rabin & Berdo, P.C.

(57) ABSTRACT

A grill comprising an upper pan unit, a lower pan unit and a lever unit. The upper and the lower pan unit have an opposite position relative to each other, which comprises at least a first opposite position and a second opposite position having different distances relative to each other. The upper pan unit comprises an upper pan mounted on an upper base. The lower pan unit comprises a lower base, a deep pan, and a shallow pan. The deep pan can be detachably mounted on the lower base in the first opposite position. The shallow pan can be detachably mounted on the lower base in the second opposite position. The top peripheries of the shallow pan and the deep pan abut against the upper pan. In both positions, the pan of the lower pan unit can abut against the bottom periphery of the upper pan to avoid the misalignment.

7 Claims, 5 Drawing Sheets

GRILL

FIELD OF THE INVENTION

The present invention relates to a grill.

BACKGROUND OF THE INVENTION

Referring to FIG. 1 and FIG. 2, traditional grill comprises an upper pan unit 10, a lower pan unit 20 and a lever unit 30 for connecting the upper pan unit 10 and lower pan unit 20. The upper pan unit 10 comprises an upper base 11 and an upper pan 12 mounted on the upper base 11; the lower unit 20 comprises a lower base 21 and a lower pan 22 mounted on the lower base 21. The upper pan unit 10 and the lower pan unit 20 have an opposite position relative to each other. Referring to FIG. 1 and FIG. 2, said opposite position comprises a first opposite position and a second opposite position having different distance relative to each other. Wherein in the second opposite position the lower pan 22 of the lower pan unit 20 abuts against the upper pan 12 of the upper pan unit 10; in the first position, the upper pan unit moves upwardly and backwardly, thus a misalignment H will be formed between the lower pan 22 of the lower pan unit 20 and the upper pan 12 of the upper pan unit 10 as is shown in FIG. 1, the misalignment will affect the appearance of the grill.

SUMMARY OF THE INVENTION

The primary object of the present invention is to provide a grill which obviates the disadvantages of the misalignment in traditional grills.

This object is achieved by providing:

A grill comprising an upper pan unit, a lower pan unit and a lever unit for connecting said upper pan unit and said lower pan unit, said upper pan unit and said lower pan unit have an opposite position relative to each other, said opposite position comprises at least a first opposite position and a second opposite position having different distance relative to each other; said upper pan unit comprising an upper base and an upper pan mounted on said upper base; said lower pan unit comprising a lower base and further comprising:

A deep pan detachably mounted on said lower base and abuts against said upper pan by the upper periphery in the first opposite position; and A shallow pan detachably mounted on said lower base and abuts against said upper pan by the upper periphery in the second opposite position;

In a preferred embodiment of the present invention, the depth of said deep pan is deeper than the depth of said shallow pan, and the difference between the two depths is equal to the vertical moving distance of the upper pan between the first opposite position and the second opposite position.

In a preferred embodiment of the present invention, said deep pan formed a first bottom wall, a first periphery wall fixed on said first bottom wall and a first connecting portion, said first connecting portion detachably mounted to said lower base; said shallow pan formed a second bottom wall, a second periphery wall fixed on said second bottom wall and a second connecting portion, said second connecting portion detachably mounted to said lower base.

In a preferred embodiment of the present invention, said first connecting portion has the same structure as the second connecting portion.

In a preferred embodiment of the present invention, said second periphery wall is formed by the flange of the second bottom wall extending upwardly.

In a preferred embodiment of the present invention, the front edge of said first periphery wall is in the rear of the front edge of said first bottom wall and formed a misalignment therein.

In a preferred embodiment of the present invention, said misalignment is equal to the transversal moving distance of said upper pan between the first opposite position and the second opposite position.

In a preferred embodiment of the present invention, said first bottom wall has the same structure as said second bottom wall.

Compared to the traditional grills, the lower pan unit of the present invention has two pans both of which can be detachably mounted in the lower base respectively, the deep pan mounted in the first opposite position and the shallow pan mounted in the second opposite position, therefore, in both positions, the pan of the lower pan unit can abut against the bottom periphery of the upper pan to avoid the misalignment, thus the grill is facilitate to heat the food and has a good appearance. The difference between the depths is equal to the vertical moving distance of the upper pan between the first opposite position and second opposite position, and said misalignment is equal to the transversal moving distance of the upper pan between the first opposite position and second opposite position. Therefore in both positions, the pan of the lower pan unit can abut against the bottom periphery of the upper pan. Said first connecting portion has the same structure as the second connecting portion and said first bottom wall has the same structure as the second bottom wall, thus both pans can be detachably mounted in the lower base. A misalignment formed between the first periphery wall and the first bottom wall, thus the periphery walls of both pans can abut against the periphery wall of the upper pan respectively.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
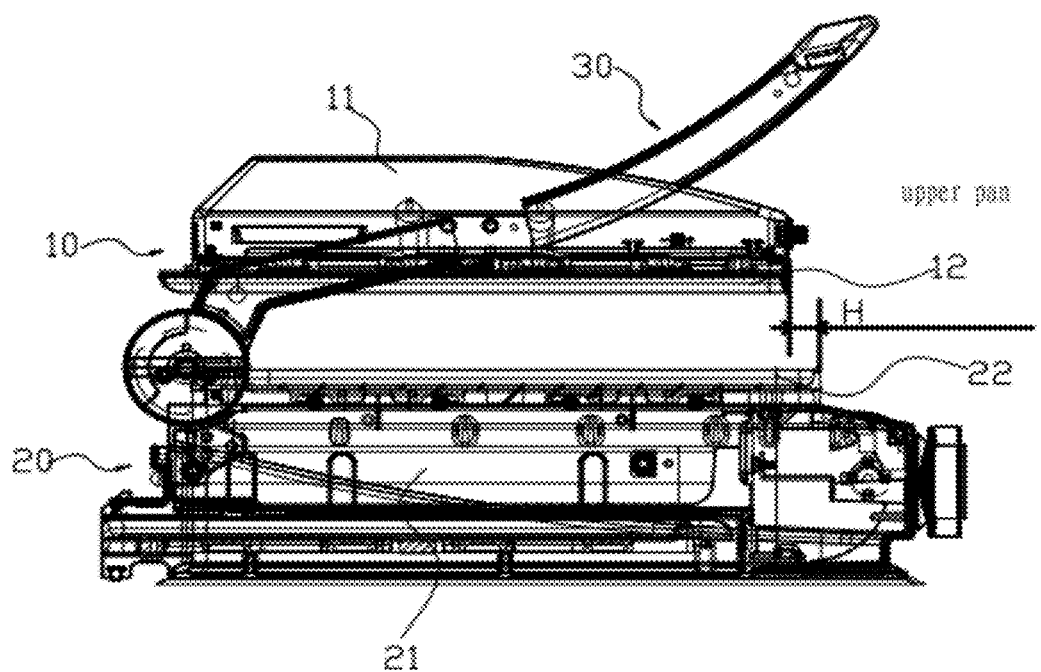
FIG. 1 is a perspective view of the traditional grill in second opposite position.
Figure 2:
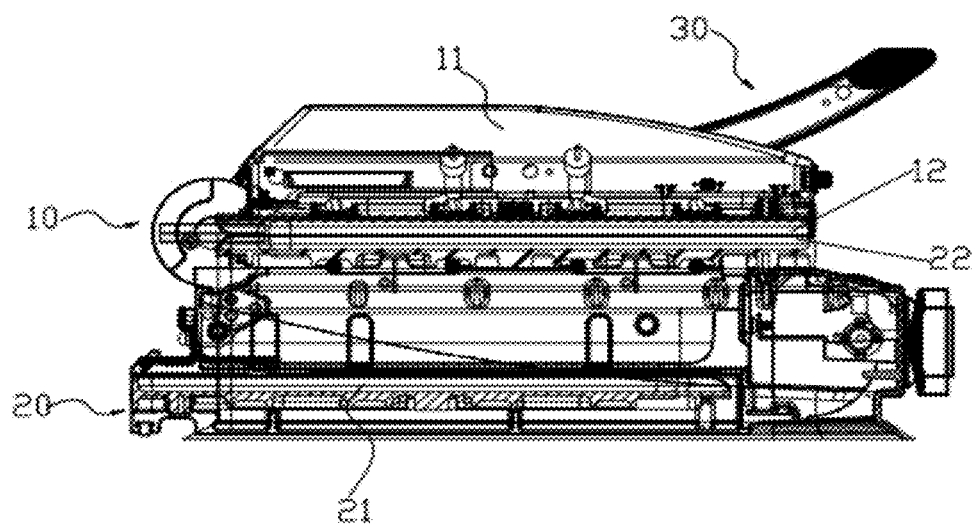
FIG. 2 is a perspective view of the traditional grill in first opposite position.
Figure 3:
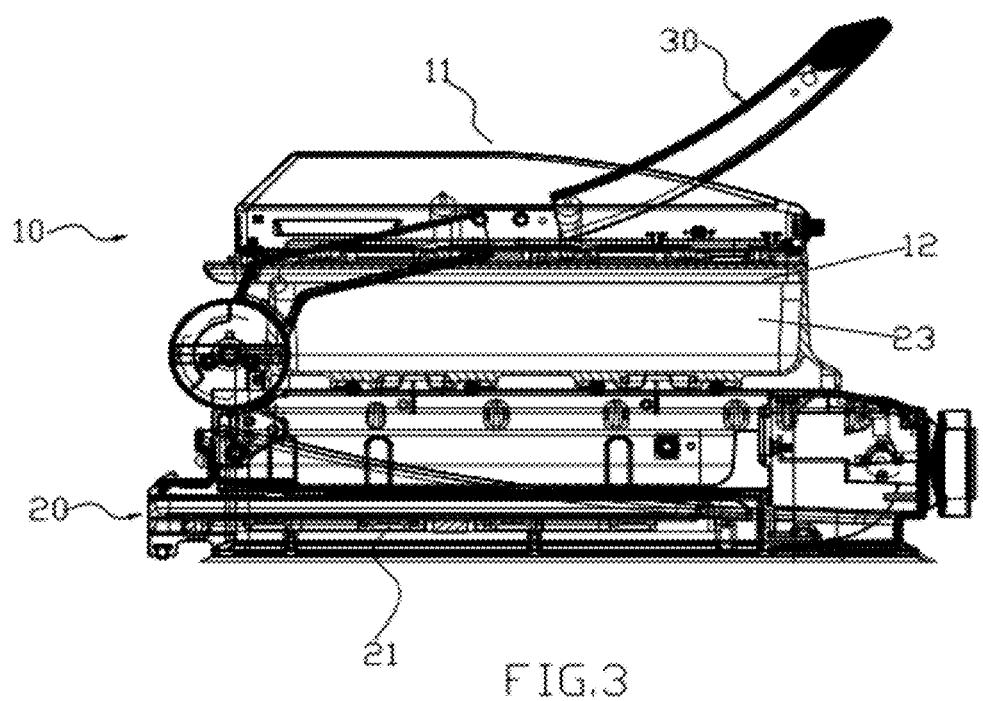
FIG. 3 is a perspective view of a grill in second opposite position according to a preferred embodiment of the present invention.

Referring to FIG. 2 and FIG. 3, a grill comprises an upper pan unit 10, a lower pan unit 20 and a lever unit 30 for connecting the upper pan unit 10 and the lower pan unit 20, said upper pan unit 10 comprises an upper base 11 and an upper pan 12 mounted on the upper base 11; and said lower pan unit 20 comprises a lower base 21 and further comprises a deep pan 23 and a shallow pan 24.

Figure 5:
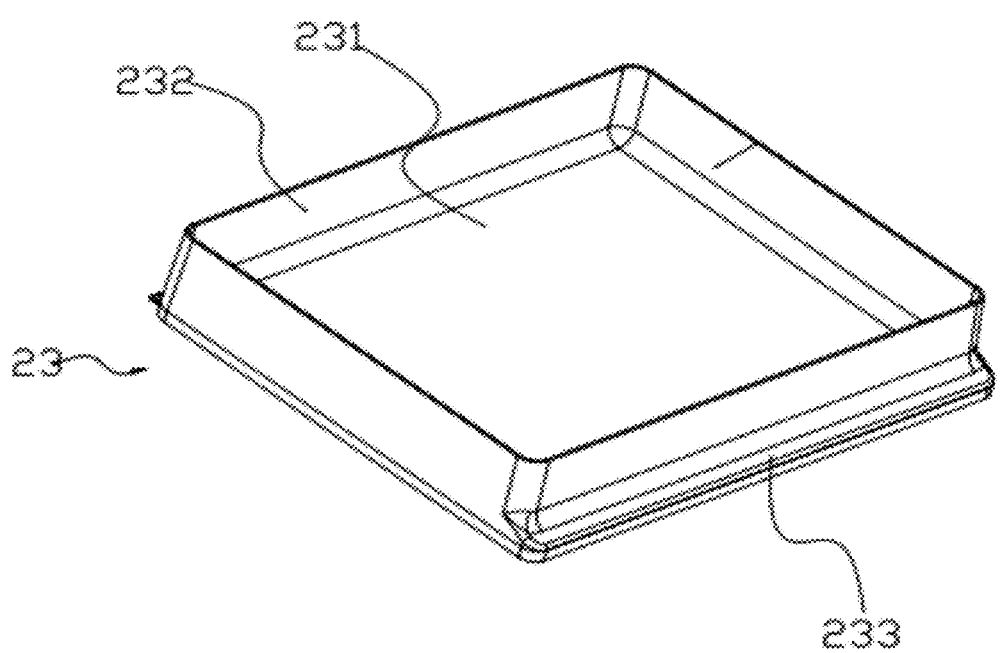
FIG. 5 is a perspective view the deep pan of the grill according to a preferred embodiment of the present invention.

The upper pan unit 10 and the lower pan unit 20 have an opposite position, said opposite position comprises at least a first opposite position and a second opposite position having different distance relative to each other;

Referring to FIG. 5, said deep pan 23 formed a first bottom wall 231, a first periphery wall 232 fixed on said first bottom wall 231 and a first connecting portion, the front side of the first periphery wall 232 is in the rear of the front side of the first bottom wall 231, and formed a misalignment 233 therein, said misalignment 233 is equal to the transversal moving distance between the upper pan 12 in the first opposite position and the second opposite position.

The shallow pan 24 formed a second bottom wall, a second periphery wall fixed on the second bottom wall and a second connecting portion, the second periphery wall is formed by the second bottom wall extending upwardly.

The first bottom wall has the same structure as the second bottom wall, the first connecting portion has the same structure as the second connecting portion, and both of the first connecting portion and the second connecting portion can detachably mounted on the lower base 21.

The depth of the deep pan 23 is deeper than the depth of the shallow pan 24, and the depth difference is equal to the vertical moving distance of the upper pan 12 between the first opposite position and the second opposite position.

In the first opposite position, the deep pan 23 detachably mounted on the lower base 21, the top of the first periphery wall of the deep pan 23 jointed to the upper pan, after being jointed, the edge of the upper pan aligned to the edge of the deep pan 23, as shown in FIG. 3

Figure 4:
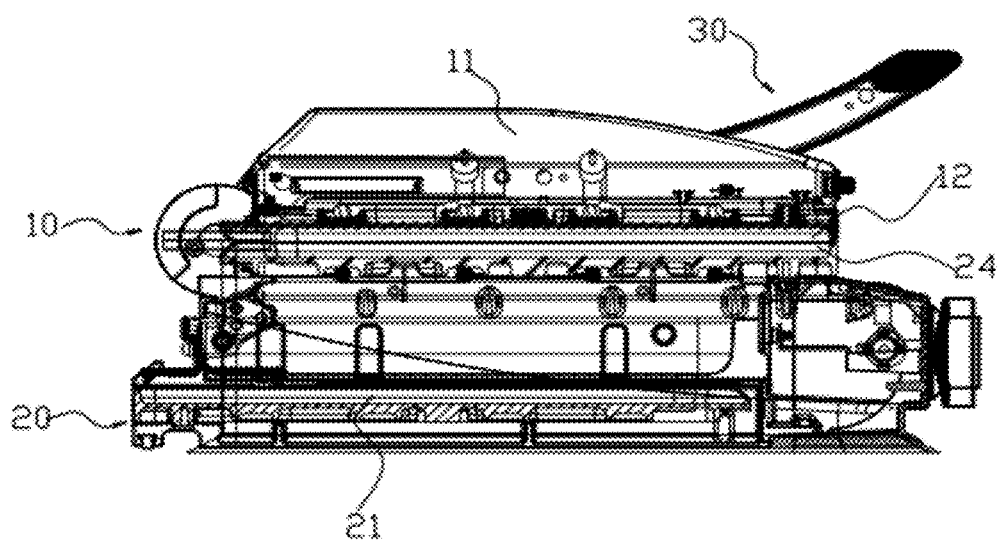
FIG. 4 is a perspective view of a grill in first opposite position according to a preferred embodiment of the present invention.

In the second opposite position, the shallow pan 24 detachably mounted on the lower base 21, the top of the second periphery wall of the deep pan 24 jointed to the upper pan, after being jointed, the edge of the upper pan aligned to the edge of the shallow pan 23, as shown in FIG. 4.

Although the present invention has been illustrated and described with reference to the preferred embodiment therein, it should be understood that it is in no way limited to the details of such embodiment but is capable of numerous modifications within the scope of the appended claims.

What is claimed is:

1. A grill, comprising:
    an upper pan unit having an upper base and an upper pan mounted on said upper base;
    a lower pan unit having a lower base, a deep pan detachably mounted on said lower base and abutting against said upper pan by an upper periphery in a first opposite position, and
    a shallow pan detachably mounted on said lower base and abutting against said upper pan by the upper periphery in a second opposite position; and
    a lever unit for connecting said upper pan unit and said lower pan unit, said upper pan unit and said lower pan unit having an opposite position relative to each other, said opposite position comprising at least the first opposite position and the second opposite position having different distance relative to each other;
    a depth of said deep pan being deeper than a depth of said shallow pan, and a difference between said two depths being equal to a vertical moving distance of the upper pan between the first opposite position and the second opposite position.

2. The grill according to claim 1, wherein said deep pan has a first bottom wall, a first periphery wall fixed on said first bottom wall and a first connecting portion, said first connecting portion being detachably mounted to said lower base;
    said shallow pan having a second bottom wall, a second periphery wall fixed on said second bottom wall and a second connecting portion, said second connecting portion being detachably mounted to said lower base.

3. The grill according to claim 2, wherein said first connecting portion has the same structure as the second connecting portion.

4. The grill according to claim 2, wherein said second periphery wall is formed by the flange of the second bottom wall extending upwardly.

5. The grill according to claim 2, wherein the front edge of said first periphery wall is in the rear of the front edge of said first bottom wall and forms a misalignment therein.

6. The grill according to claim 5, wherein said misalignment is equal to the transversal moving distance of said upper pan between the first opposite position and the second opposite position.

7. The grill according to claim 2, wherein said first bottom wall has the same structure as said second bottom wall.

* * * * *